United States Patent Office 3,326,926
Patented June 20, 1967

3,326,926
4,4'-BIPYRIDYLIUM QUATERNARY SALTS
Ronald Frederick Homer, Wokingham, England, assignor to Imperial Chemical Industries Limited, London, England, a corporation of Great Britain
No Drawing. Filed Apr. 22, 1963, Ser. No. 274,774
Claims priority, application Great Britain, Apr. 25, 1962, 15,809/62
3 Claims. (Cl. 260—296)

This invention relates to herbicidal 4,4'-bipyridylium quaternary salts, to processes for their preparation and to their use as herbicides.

The invention consists in one aspect of herbicidal 4,4'-bipyridylium quaternary salts having an aliphatic hydrocarbon radical as substituent on each of the nitrogen atoms of the bipyridyl nucleus, one of the said aliphatic radicals being an unsaturated radical and the second aliphatic radical being an unsaturated or a saturated radical.

An unsaturated radical there can be used, for instance, one having 2–8 carbon atoms and especially one having 2, 3 or 4 carbon atoms. Where the groups R and $R_1$ are both unsaturated aliphatic radicals, these radicals can be the same or different. The saturated radical can be an alkyl radical having 1–8 carbon atoms, and especially a methyl, ethyl, propyl or butyl radical. Thus the compounds can be, for instance, compounds of the formula:

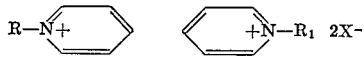

where R is an alkenyl radical; $R_1$ is an alkenyl or an alkyl radical; and $X^-$ is an anion.

The anion $X^-$ can be, for example, a chloride, bromide or methosulphate ion. The choice of anion depends to a large extent upon the solubility of the respective salts in water and upon the ease with which the salts can be obtained by quaternising 4,4'-dipyridyl or one of its mono-quaternary salts. On the whole, it is convenient for the anion to be a chloride ion, in which instance the salts can be obtained using the appropriate chloro-compounds as quaternising agents.

The invention also consists in a process for the preparation of the compounds of the invention, in which 4,4'-bipyridyl or a mono-quaternary salt thereof is quaternised with a suitable quaternising agent. Where a mono-quaternary salt of 4,4'- bipyridyl is used, for instance in the preparation of an unsymmetrical di-quaternary salt, the salt should be so chosen that the substituent on its quaternary nitrogen atom is one of the desired aliphatic radicals in the diquaternary salt, and the quaternising agent used is such that it introduces the required second aliphatic radical. The process can be performed simply by heating a mixture of 4,4'-bipyridyl (or the mono-quaternary salt as the case may be) with the quaternising agent. However, in some instances, especially where operating on a large scale, it may be more convenient to use a suitable liquid as solvent or diluent for the reactants.

The compounds of this invention show herbicidal activity together with the valuable property of being de-activated when they come into contact with soil. Thus the invention also includes herbicidal compositions containing as active ingredient a compound of the invention, and a carrier for the active ingredient. The composition can, for example, be a liquid composition obtained by dissolving or dispersing the active ingredient in a suitable liquid diluent, for example water or a suitable organic liquid. The herbicidal composition alternatively can be in the solid state, for instance a powder or granules, in which the carrier is a suitable solid. Substances which should preferably be avoided for use as the carrier are substances which are highly adsorptive and those which act as cation-exchange materials. The compositions can contain a wetting or dispersing agent to facilitate their use as spray compositions, or indeed can contain any other type of substance known to the art as being suitable as an adjuvant in herbicidal compositions, for instance, stickers, binders, corrosion inhibitors and colouring agents.

Any wetting or dispersing agent used in the herbicidal compositions should preferably be a non-ionic surface-active compound, for instance an ethylene oxide-octyl phenol condensate, or a cationic compound, so as to avoid any undesirable interaction between the surface-active compound and the bipyridylium salt which might take place if an anionic compound were to be used as surface-active compound.

The invention further consists in a method of killing, desicating or controlling the growth of vegetation, in which the vegetation is treated with an effective amount of a compound or herbicidal composition of this invention.

The invention is illustrated by the following Examples.

*Example 1*

This example describes the preparation of 1,1'-di-allyl-4,4'-bipyridylium dibromide.

A mixture of allyl bromide (20 ml.) and 4,4'-bipyridyl (5 g.) was refluxed for 8 hours, after which the solid which had separated out was collected, ground with acetone, filtered, and then washed with acetone. The product after being dried at 80° C. was obtained as a hygroscopic solid, melting point, 180–185° C. This product has been found to show useful total herbicidal properties against a range of typical plant species.

*Example 2*

The herbicidal properties of the product of Example 1 are illustrated by greenhouse tests described below in which it has been tested as an aqueous solution by being sprayed on the following representative plant species: wheat (Triticum spp.), marigold (Calendula officinalis), mustard (Brassica alba), sugar beet (Beta vulgaris), red clover (Trifolium pratense) and cleavers (Galium aparine).

The aqueous compositions were tested, containing respectively 0.02 and 0.005 lb./gallon of the test chemical, each composition containing 0.3% by weight of a wetting agent consisting of a 30% aqueous solution of a condensation product of one mole of p-octyl cresol with 9–10 moles of ethylene oxide. The two aqueous compositions were sprayed on the six representative plant species in an amount corresponding to 100 gallons/acre. Thus the amount of the bipyridylium salt applied to the plant species by using the two aqueous compositions corresponded to rates of 2 and 0.5 lb. of test chemical/acre.

The results obtained fourteen days after spraying are set out in the table below in which the herbicidal activity of each of the compositions tested is indicated by a grading number from 0 to 5.

The grading numbers used have the following meanings:

5—Complete kill

4—Very severe damage with partial kill
1—Slight damage

It will be seen that at the rate of 2 lb./acre a complete kill was obtained of all but one of the plant species tested.

| Rate of application (lb./acre) | Wheat | Marigold | Sugar Beet | Mustard | Cleavers | Red Clover |
|---|---|---|---|---|---|---|
| 2 | 5 | 5 | 5 | 1 | 5 | 5 |
| 0.5 | 5 | 4 | 4 | 1 | 4 | 5 |

*Example 3*

This example describes the preparation of 1-allyl-1'-methyl-4,4'-bipyridylium dibromide.

1-methyl-4(4'-pyridyl) pyridinium bromide (2 g.) was heated under reflux conditions for 5 hours with freshly distilled allyl bromide (15 ml.). The yellow solid which formed was collected by filtration and recrystallised from a methanol/acetone mixture. The resulting product weighed 2 g., had a melting point above 340° C., and was found by paper chromatography to be homogeneous. Analysis of the product showed it to contain C, 45.3% H, 4.7%, N, 7.8% (theoretical figures for $C_{14}H_{16}N_2Br_2$: C, 45.2%, H, 4.3%, N, 7.5%).

The product was found to have herbicidal properties.

What we claim is:

1. A 4,4'-bipyridylium quaternary salt having the formula:

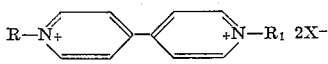

where R and $R_1$ are both allyl and $X^-$ is an anion.

2. A compound as claimed in claim 1 which is a salt selected from the group consisting of chloride, bromide and methosulphate.

3. 1.1'-di-allyl-4,4'-bipyridylium dibromide.

References Cited

UNITED STATES PATENTS

| 2,773,066 | 12/1956 | Linnell et al. | 260—296 |
| 2,909,527 | 10/1959 | Shapiro et al. | 260—296 |
| 2,972,528 | 2/1961 | Brian et al. | 260—296 |
| 3,069,253 | 12/1962 | Sousa | 71—2.5 |
| 3,092,483 | 6/1963 | Perkow | 71—2.5 |
| 3,156,551 | 11/1964 | Brian et al. | 260—296 |
| 3,168,503 | 2/1965 | Kramer et al. | 260—296 |

OTHER REFERENCES

Emmert et al., "Chem. Ber." vol. 54, pages 3168–3176 (1921).

Emmert et al., "Chem. Ber." vol. 56, pages 83–91 (1923).

WALTER A. MODANCE, *Primary Examiner.*

J. S. LEVITT, J. O. THOMAS, *Examiners.*

R. T. BOND, J. A. PATTEN, *Assistant Examiners.*